UNITED STATES PATENT OFFICE.

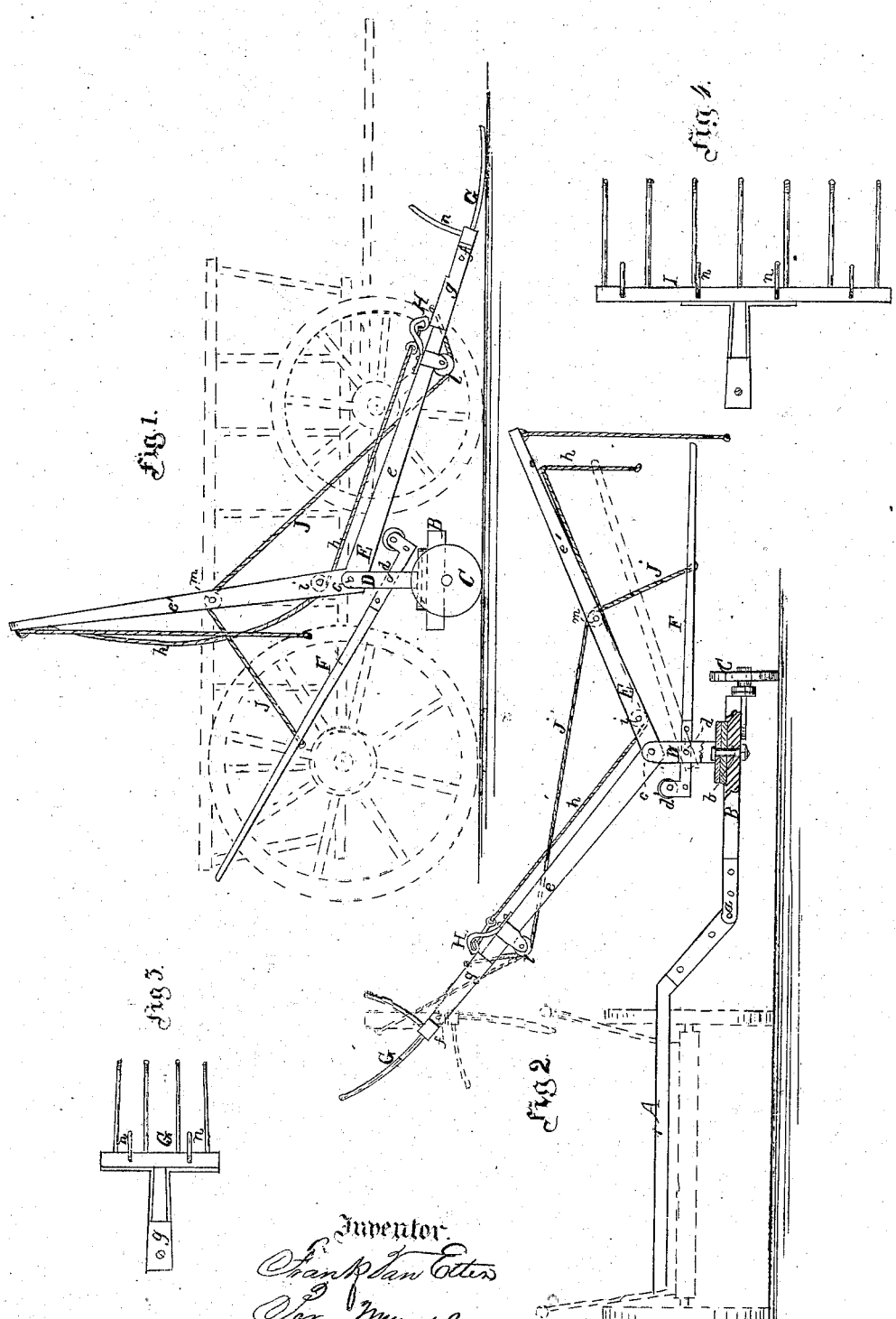

FRANK VAN ETTEN, OF JACKSON, MICHIGAN.

IMPROVEMENT IN HAY-LOADERS.

Specification forming part of Letters Patent No. 54,627, dated May 8, 1866.

*To all whom it may concern:*

Be it known that I, FRANK VAN ETTEN, of Jackson, Jackson county, State of Michigan, have invented a new and Improved Hay-Loading Device; and I do hereby declare that the following is a full, clear, and exact description thereof, which will enable others skilled in the art to make and use the same, reference being had to the accompanying drawings, forming part of this specification, in which—

Figure 1 is a side view of my invention applied to a wagon; Fig. 2, a rear view of the same; Figs. 3 and 4, detached plan or top views of the forks or rakes pertaining to the same.

Similar letters of reference indicate like parts.

This invention relates to a new and improved device for loading wagons or carts with hay, and is designed to supersede the tedious and laborious work of pitching the hay on the wagon or cart by hand.

The invention consists of a fork or rake and levers applied to a pivoted standard which is secured on an arm attached to the vehicle, and all arranged in such a manner that the hay, as the wagon or cart is drawn along, will be taken up by the fork or rake either from the cock, windrow, or swath, and by a simple manipulation on the part of the operator deposited on the wagon or cart.

A represents an arm which is secured by suitable bolts to the bed of the hay-rack on the wagon or cart. This arm is of such a length that it may project out from one side of the wagon or cart, and this projecting end extends obliquely downward, and has a bed-piece, B, attached to it by a joint, $a$, the outer end of said bed-piece being supported by a wheel, C. (See Figs. 1 and 2.) On this bed-piece B there is secured, by a pivot-bolt, $b$, a short standard, D. This standard is allowed to turn freely on bolt $b$, like a swivel, and in the upper end of said standard a bent lever, E, is secured by a fulcrum-pin, $c$, the latter passing through the angle of the lever, as shown clearly in Fig. 1.

In the standard D, below the lever E, there is secured by a fulcrum-pin, $d$, another lever, F, having a roller, $d'$, in its front end, which roller is under the inner part of the lower arm, $e$, of lever E, as shown clearly in Fig. 1.

To the outer end of the lower arm, $e$, of the lever E there is attached, by a pivot, $f$, a fork, G. The pivot $f$ passes through the shank $g$ of the fork, said shank being of shell or socket form, so as to fit over the arm $e$ when the fork is in a working position, the fork being secured in such position by a spring-catch, H, which has a cord, $h$, attached to it, said cord passing through a slot and under a pulley, $i$, in the upper arm, $e'$, of the lever E, and having its end passing through an eye in the upper part of the arm $e'$.

The inner end of the shank $g$ has a cord, $j$, attached to it; and this cord passes through a slot in the arm $e$ of lever E, and underneath a pulley, $l$, at the under side of the same, and thence back through the arm $e$, over a pulley, $m$, in the arm $e'$, and is attached to lever F, as shown clearly in Figs. 1 and 2.

The operation is as follows: As the wagon or cart is drawn along the attendant or operator has hold of the lever F, and by means of said lever moves the fork G either to the right or left, or raises it to pass over obstructions which may be in its path. This fork gathers up the hay either from a windrow or cock. In loading from cocks the fork is inserted underneath the same, and the fork, when filled from the windrow, or when inserted underneath the cock, is raised by the operator pulling down the upper arm, $e'$, of the lever E, the lever arm $e$ and the fork G, with its load, being thereby raised. The operator then, through the medium of lever F, turns the swivel-standard D one-quarter of a revolution, and by so doing brings the loaded fork over the wagon or cart. (See Fig. 2.) The cord $h$ is then pulled to operate the catch H and release the shank $g$ of the fork G, the latter then dropping, as shown in red, Fig. 2, and the load discharged upon the wagon or cart. The fork is then turned back or off from the wagon or cart, and is allowed to descend to a working position, the operator holding the lever F so that the cord $j$ will draw down the shank $g$ of the fork and cause it to engage with the catch H.

In loading a wagon or cart from the swath I employ a rake, I. (Shown in Fig. 4.) This rake is constructed on the same principle as the fork, it simply having a greater number of teeth or tines.

Both the fork and the rake are provided with guards $m$ $m$ on their heads to prevent the hay slipping backward as the fork and rake are elevated.

Having thus described my invention, I claim as new and desire to secure by Letters Patent—

The bent lever E, having the fork G or rake I, pivoted to the outer end of its lower arm, e, in combination with the lever F, swivel-standard D, the cords and catch, and the bed-piece B, connected to the arm A, all being arranged and applied to a wagon or cart to operate in the manner substantially as and for the purpose set forth.

FRANK VAN ETTEN.

Witnesses:
  JOSHUA G. CLARK,
  HERMAN LESTER.